(12) United States Patent
MacPhee (10) Patent No.: US 11,318,432 B2
(45) Date of Patent: May 3, 2022

(54) CONFINED TUBE ASPIRATION AERATION DEVICES AND SYSTEMS (71) Applicant: THE BOARD OF TRUSTEES OF THE UNIVERSITY OF ALABAMA, Tuscaloosa, AL (US)

(72) Inventor: David W. MacPhee, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 216 days.

(21) Appl. No.: 16/791,267

(22) Filed: Feb. 14, 2020

(65) Prior Publication Data
US 2020/0261865 A1 Aug. 20, 2020

Related U.S. Application Data (60) Provisional application No. 62/806,235, filed on Feb. 15, 2019.

(51) Int. Cl.
B01F 25/30 (2022.01)
C02F 3/12 (2006.01)
B01F 25/312 (2022.01)
B01F 23/232 (2022.01)

(52) U.S. Cl.
CPC ........ B01F 25/312 (2022.01); B01F 23/2323 (2022.01); B01F 25/30 (2022.01); C02F 3/1294 (2013.01)

(58) Field of Classification Search
CPC .... B01F 3/0421; B01F 5/0413; B01F 5/0418; B01F 3/04503; B01F 25/30; B01F 25/312; C02F 3/1294
See application file for complete search history.

(56) References Cited

U.S. PATENT DOCUMENTS 6,306,304 B1 * 10/2001 Sweet ................... C02F 3/1294
210/629

FOREIGN PATENT DOCUMENTS

KR KK665712 B1 * 1/2007 ................ C02F 1/74

* cited by examiner

Primary Examiner — Robert A Hopkins
(74) Attorney, Agent, or Firm — Meunier Carlin & Curfman LLC (57) ABSTRACT Various implementations include an aeration device. The aeration device includes a venturi tube and an outlet tube. The venturi tube has an outlet port and an air intake port. The outlet tube has a first end coupled to the outlet port of the venturi tube, a second end opposite and spaced apart from the first end, and an intermediate portion disposed between the first and second ends of the outlet tube. The intermediate portion is helically shaped and extends around a helical axis of the intermediate portion. The intermediate portion extends at least one rotation about the helical axis.

19 Claims, 9 Drawing Sheets

CONFINED TUBE ASPIRATION AERATION DEVICES AND SYSTEMS

CROSS-REFERENCE TO RELATED APPLICATIONS

This application claims the benefit of U.S. Provisional Patent Application No. 62/806,235, filed Feb. 15, 2019, the content of which is incorporated herein by reference in its entirety.

BACKGROUND

The wastewater treatment process plays an essential role in our society, as a significant amount of sewage must be cleaned (or treated) before being released back into the environment. There are currently around 15,000 wastewater treatment facilities in the United States of America, many of which utilize the activated sludge process, wherein aerobic micro-organisms are used to digest influent organic matter and remove nutrients. In this process, micro-organisms and other insoluble materials clump together by a process known as flocculation, and the effluent streams include a liquid that is relatively free of suspended solids and organic matter, as well as a sludge resulting from the flocculation and growth of micro-organisms that must be removed and disposed of.

The organisms that digest organic matter do so largely utilizing a process known as aerobic digestion. To accomplish this, an adequate supply of oxygen is needed to feed cellular respiration and treat the wastewater in an effective and timely matter. Due to a high biochemical oxygen demand in the influent organic matter, additional oxygen must be added during the treatment process to ensure the carbonaceous biological matter can be properly digested. This process is known as aeration and represents the overwhelming majority of energy usage in a treatment plant. To accomplish this, a myriad of techniques can be employed, the most popular of which are bubble diffusers and surface aerators.

Bubble diffusers require a fan or compressor to force air down into the bottom of deep tanks, where it is pushed through a fine mesh ensuring a small bubble size, and hence, more surface area per unit volume flow to facilitate oxygen diffusion across the air/water interface. This technique is perhaps the most efficient currently in the industry. Surface aerators are also quite popular and usually involve a cone with helical vanes which rotate in the wastewater, drawing the liquid from the bottom of tanks, splashing it into the air, and agitating the surface. This increases the contact area with air but in an opposite way compared to bubble diffusers, i.e., water is flung into the air instead of air bubbled into the water.

Both of the aforementioned techniques are fundamentally inefficient. For example, while the purpose of bubble diffusers is to introduce oxygen bubbles into the liquid, air must be compressed beyond the static pressure of the bottom of the tank. Additional compression is required to force the air through a fine mesh at its intended flow rate. It is estimated that over 80% of the energy used to compress air is converted into heat. Although this value could be somewhat less for wastewater treatment blowers due to the lower pressure requirements, it is nonetheless not ideal.

Surface aerators, while less complicated and generally cheaper in cost, are even less efficient at delivering oxygen to the micro-organisms in the wastewater. This is not surprising, since much of the oxygen transfer is enhanced through projecting water into the air. This kinetic energy is wasted once the water re-enters the tank.

Thus, a need exists for a device for delivering oxygen to a wastewater stream at a higher efficiency and at lower a lower cost than existing technologies.

SUMMARY

Various implementations include an aeration device. The aeration device includes a venturi tube and an outlet tube. The venturi tube has an outlet port and an air intake port. The outlet tube has a first end coupled to the outlet port of the venturi tube, a second end opposite and spaced apart from the first end, and an intermediate portion disposed between the first and second ends of the outlet tube. The intermediate portion is helically shaped and extends around a helical axis of the intermediate portion. The intermediate portion extends at least one rotation about the helical axis.

In some implementations, the helical axis is disposed at an angle to a gravitational axis. The angle is greater than 0 degrees and less than 180 degrees. In some implementations, the angle is 90 degrees.

In some implementations, the at least one rotation comprises no angled bends in the outlet tube. In some implementations, the at least one rotation comprises three or more angled turns.

In some implementations, the at least one rotation comprises two rotations. In some implementations, the at least one rotation comprises three rotations. In some implementations, the at least one rotation comprises four or more rotations.

In some implementations, the aeration device further includes a pump for pumping a liquid through the venturi tube and the outlet tube. In some implementations, the pump causes the liquid to flow through the outlet tube at 50 gallons per minute or more.

Various other implementations include an aeration system. The aeration system includes two or more venturi tubes and two or more outlet tubes. Each of the two or more venturi tubes has an outlet port and an air intake port. Each of the two or more outlet tubes has a first end coupled to the outlet port of one of the venturi tubes, a second end opposite and spaced apart from the first end, and an intermediate portion disposed between the first and second ends of the outlet tube. The intermediate portion is helically shaped and extends around a helical axis of the intermediate portion. The intermediate portion extends at least one rotation about the helical axis.

In some implementations, each of the second ends of the two or more outlet tubes are coupled together such that the second ends of the two or more outlet tubes are in fluid communication with each other.

In some implementations, the helical axis is disposed at an angle to a gravitational axis. The angle is greater than 0 degrees and less than 180 degrees. In some implementations, the angle is 90 degrees.

In some implementations, the at least one rotation comprises no angled bends in the outlet tube. In some implementations, the at least one rotation comprises three or more angled turns.

In some implementations, the at least one rotation comprises two rotations. In some implementations, the at least one rotation comprises three rotations.

In some implementations, the system further includes a pump for pumping a liquid through the two or more venturi tubes and the two or more outlet tubes. In some implementations, the pump causes the liquid to flow through the two or more outlet tubes at a total of 50 gallons per minute or more.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Various implementations include an aeration device. The aeration device includes a venturi tube and an outlet tube. The venturi tube has an outlet port. The outlet tube has a first end coupled to the outlet port of the venturi tube, a second end opposite and spaced apart from the first end, and an intermediate portion disposed between the first and second ends of the outlet tube. The intermediate portion is helically shaped and extends around a helical axis of the intermediate portion. The intermediate portion extends at least one rotation about the helical axis.

Figure 1A:
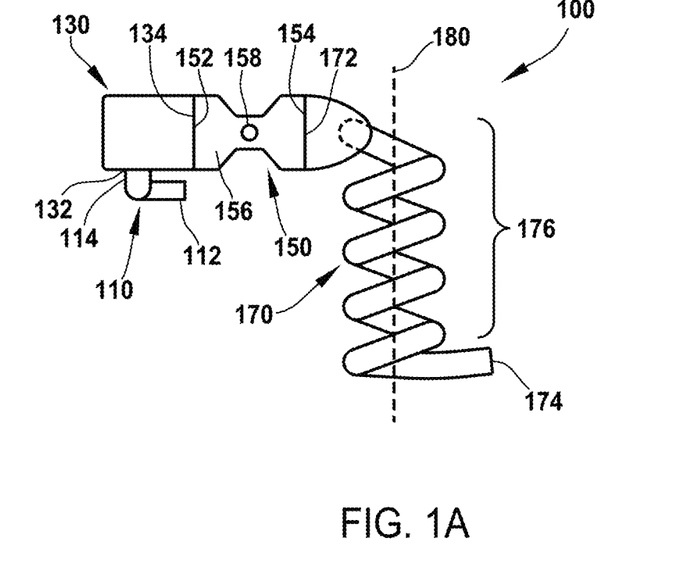
FIG. 1A is a top view of an aeration device disposed in a fluid reservoir, according to one implementation.
Figure 1B:
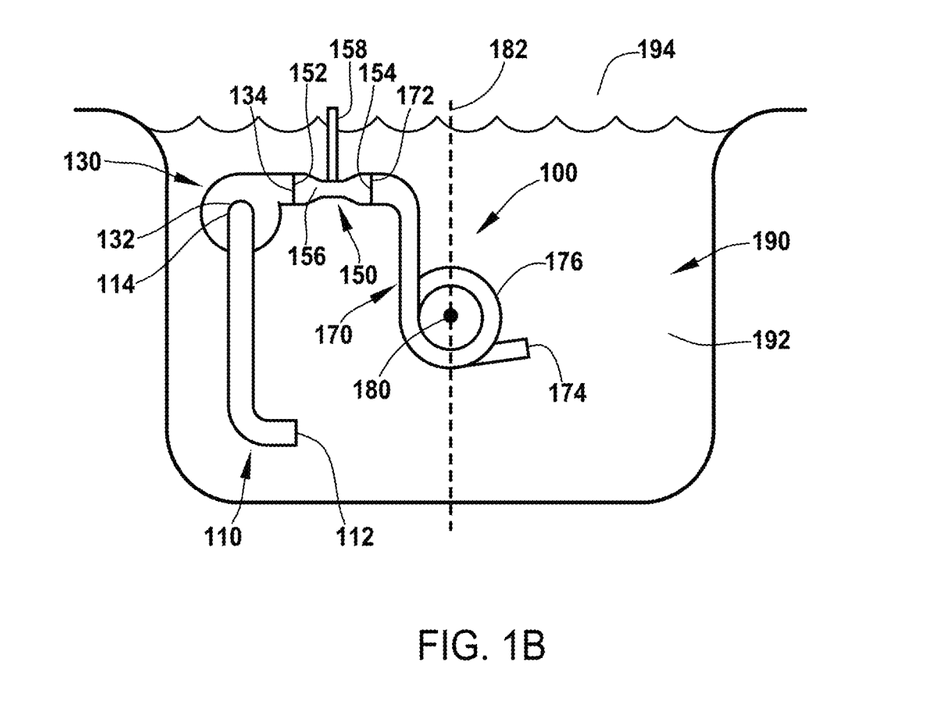
FIG. 1B is a side view of the aeration device shown in FIG. 1A.

FIG. 1A shows a top view of an aeration device 100, and FIG. 1B shows a side view of the aeration device 100. The aeration device has an inlet tube 110, a pump 130, a venturi tube 150, and an outlet tube 170. A portion of the aeration device 100 is disposed in a reservoir 190 containing a liquid 192, which can contain a mixture of liquid and solid matter. The reservoir 190 shown in FIGS. 1A and 1B is a wastewater treatment reservoir containing influent organic matter, but in other implementations, the liquid reservoir is any other hollow body capable of containing a liquid and/or solid mixture to be pumped through the aeration device, as discussed below. The aeration device 100 pumps liquid 192 through the venturi tube 150 to add air to the liquid 192. The air enters the liquid stream in relatively large bubbles. As the liquid 192 and air flow from the venturi tube 150 through the helical shaped outlet tube 170, the liquid 192 and air are gently mixed together, causing the air to dissolve into the liquid 192 before exiting the outlet tube 170 back into the reservoir 190.

The inlet tube 110 has a first end 112, a second end opposite 114 and spaced apart from the first end 112. Liquid 192 in the reservoir 190 enters the inlet tube 110 through the first end 112 and flows to the second end 114.

The pump 130 shown in FIGS. 1A and 1B has a pump inlet 132 and a pump outlet 134. The pump inlet 132 is coupled to, and in fluid communication with, the second end 114 of the inlet tube 110. The pump 130 causes the flow of the liquid 192 from the reservoir 190, into the inlet tube 110, to the venturi tube 150, and out of the outlet tube 170, as discussed below.

The venturi tube 150 has an inlet port 152, an outlet port 154 opposite the inlet port 152, a mixing chamber 156 disposed between the inlet port 152 and the outlet port 154, and an air intake port 158 in fluid communication with the mixing chamber 156. The diameter of the mixing chamber 156 is less than the diameter of the inlet port 152 and outlet port 154. The inlet port 152 of the venturi tube 150 is coupled to and in fluid communication with mixing chamber 156 of the venturi tube 150. The pump outlet 134 is coupled to, and in fluid communication with, the inlet port 152 of the venturi tube 150.

The outlet tube 170 has a first end 172, a second end 174 opposite and spaced apart from the first end 172, and an intermediate portion 176 disposed between the first end 172 and second end 174 of the outlet tube 170. The first end 172 of the outlet tube 170 is coupled to, and in fluid communication with, the outlet port 154. The second end 174 of the outlet tube 170 is in fluid communication with the reservoir 190. The intermediate portion 176 is helically shaped and extends around a helical axis 180 of the intermediate portion 176. The intermediate portion 176 shown in FIGS. 1A and 1B extends four rotations about the helical axis 180, but in other implementations, the intermediate portion extends one or more rotations about the helical axis.

In use, the pump 130 causes a pressure differential between the pump inlet 152 and pump outlet 154, which causes the liquid 192 to flow into the inlet tube 110 and through the venturi tube 150 and outlet tube 170 of the aeration device 100. The pump 130 shown in FIGS. 1A and 1B is capable of pumping 50 gallons per minute or more of liquid 192 through the inlet tube 110, venturi tube 150, and outlet tube 170 of the aeration device 100. However, in other implementations, the pump is capable of pumping liquid at any desired flow rate through the inlet tube, venturi tube, and outlet tube of the aeration device based on the volume of liquid in the liquid reservoir and the desired amount of gases to be dissolved in the liquid reservoir. The pump shown in FIGS. 1A and 1B is a centrifugal pump, but in other implementations, the pump is a reciprocating pump, a rotary pump, or any other type of pump capable of pumping a liquid/solid mixture through the aeration device.

As the liquid 192 flows from the inlet port 152 of the venturi tube 150 to the outlet port 154 of the venturi tube 150, the venturi effect causes gases (e.g., air) from outside of the reservoir 190 to flow through the air intake port 158 into the mixing chamber 156. The gases then flow with the liquid 192 through the outlet port 154 of the venturi tube 150, through the outlet tube 170, and into the reservoir 190. As the liquid 192 and the gases flow through the one or more rotations of the intermediate portion 176 of the outlet tube 170, the gases are gently mixed with the liquid 192 such that the relatively large bubbles of gas dissolve into the liquid 192.

The helical axis 180 of the aeration device 100 shown in FIGS. 1A and 1B is disposed perpendicular to a gravitational axis 182 when the aeration device 100 is installed. Because the helical axis 180 is horizontal when installed (at a 90 degree angle to the gravitational axis 182), the liquid 192 flowing through the intermediate portion 176 of the outlet tube 170 is able to sweep the gases introduced by the venturi tube 150 around the outlet tube 170 rather than allowing the gases to separate from the liquid 192 and settle at the top of the outlet tube 170. Although the helical axis 180 of the aeration device 100 shown in FIGS. 1A and 1B is perpendicular to the gravitational axis 182, in other implementations, the helical axis may be at any angle greater than zero degrees to the gravitational axis such that the helical axis is not parallel to the gravitational axis.

Figure 2A:
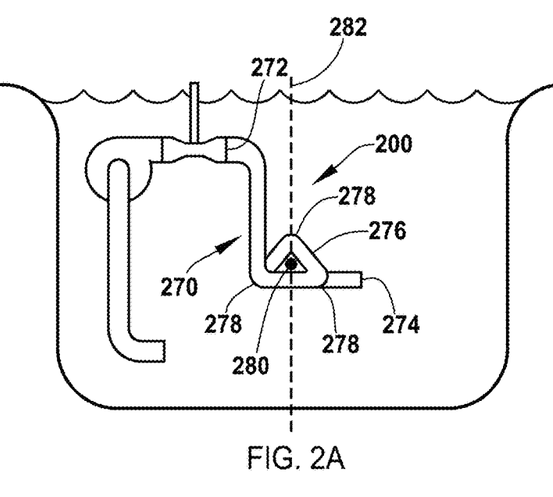
FIGS. 2A-2D are side views of aeration devices, according to other implementations, having outlet tubes with angled turns.
Figure 2B:
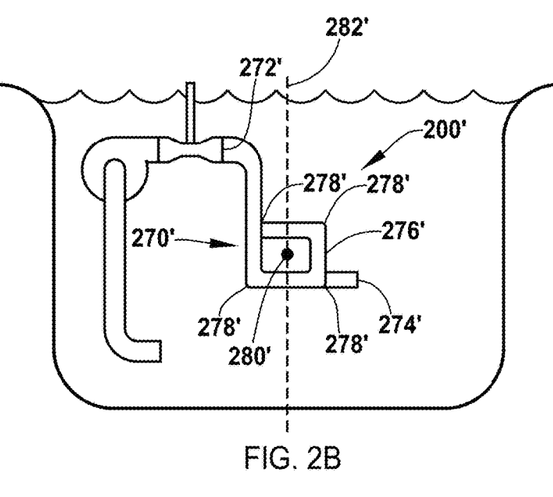
Figure 2C:
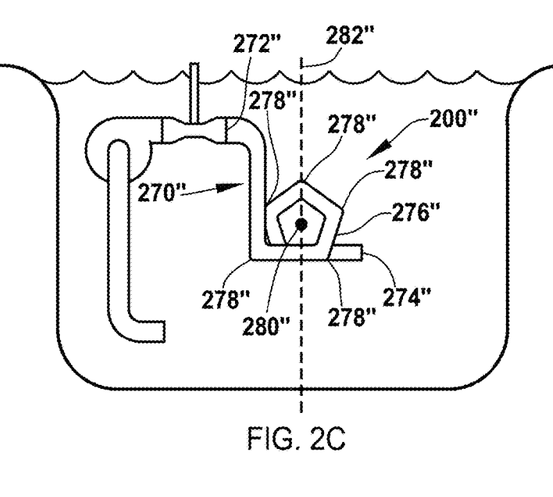
Figure 2D:
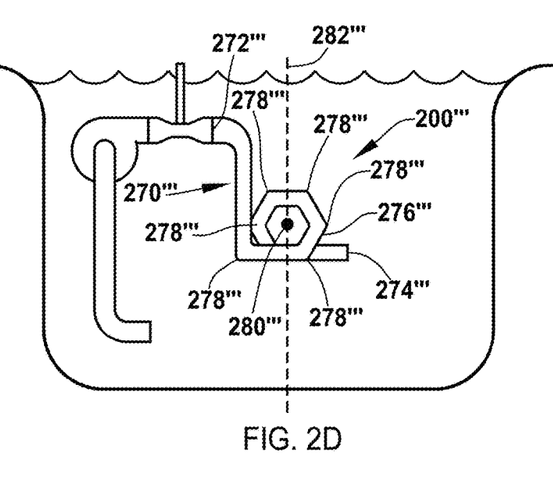

FIGS. 2A-2D show aeration devices similar to the aeration device 100 shown in FIGS. 1A and 1B, but the intermediate portions of the aeration devices shown in FIGS. 2A-2D have angled bends around the helical axis. For example, in FIG. 2A, each rotation of the intermediate portion 276 of the outlet tube 270 around the helical axis 280 has three angled bends 278. In FIG. 2B, each rotation of the intermediate portion 276' of the outlet tube 270' around the helical axis 280' has four angled bends 278'. In FIG. 2C, each rotation of the intermediate portion 276" of the outlet tube 270" around the helical axis 280" has five angled bends 278". And in FIG. 2D, each rotation of the intermediate portion 276''' of the outlet tube 270''' around the helical axis 280''' has six angled bends 278'''.

Figure 11:
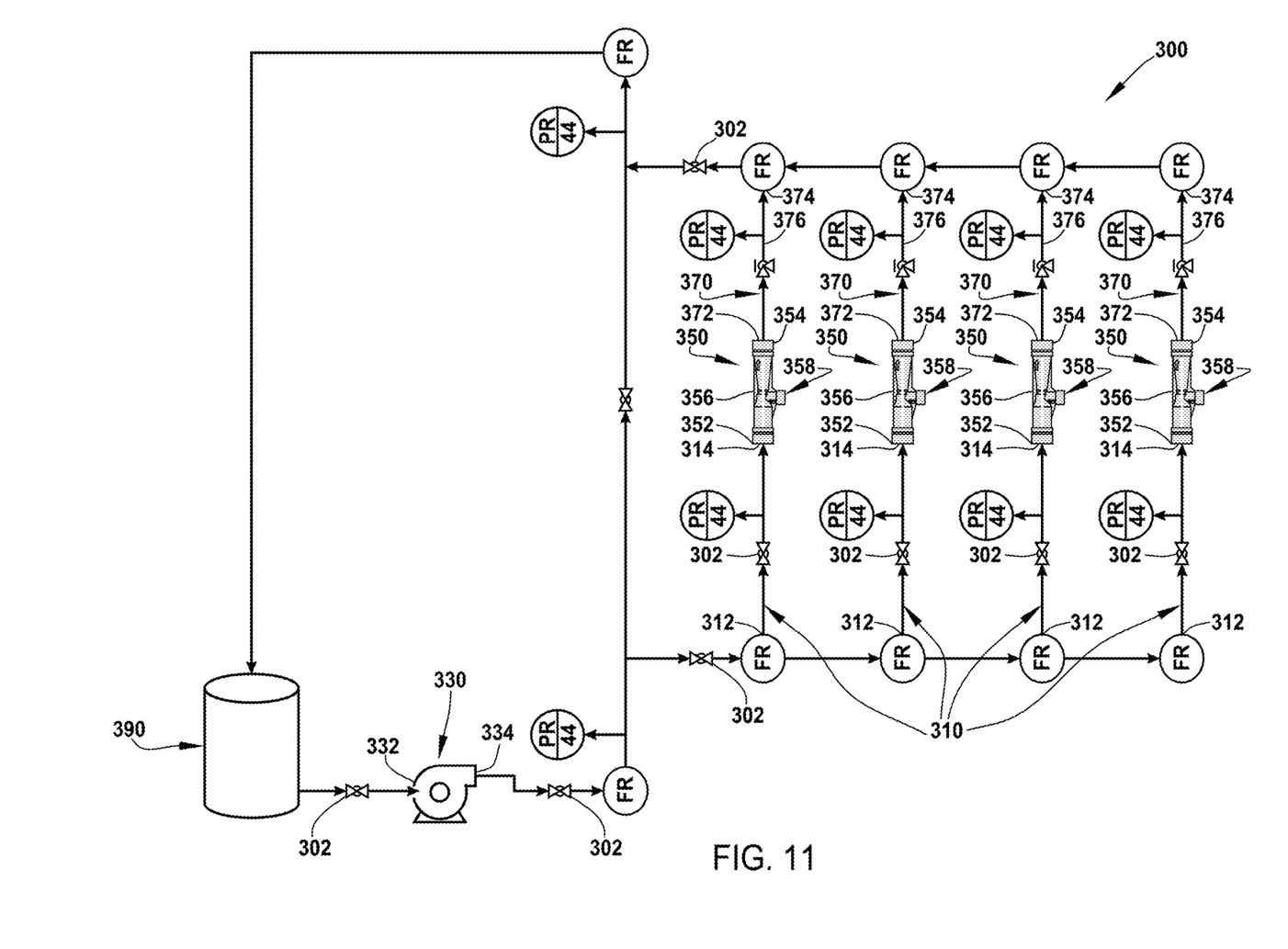
FIG. 11 is a schematic view of a proposed optimized system.

FIG. 11 shows a schematic view of an aeration system 300 including four venturi tubes 350, a pump 330, four inlet tubes 310, and four outlet tubes 370. As with the venturi tube 150 shown in FIGS. 1A and 1B, the venturi tubes 350 shown in FIG. 11 each have an inlet port 352, an outlet port 354 opposite the inlet port 352, a mixing chamber 356 disposed between the inlet port 352 and the outlet port 354, and an air intake port 358 in fluid communication with the mixing chamber 356. The diameter of the mixing chamber 356 is less than the diameter of the inlet port 352 and outlet port 354. The inlet port 352 of the venturi tube 350 is coupled to and in fluid communication with mixing chamber 356 of the venturi tube 350.

The pump 330 shown in FIG. 11 has a pump inlet 332 and a pump outlet 334. The pump 330 causes the flow of the liquid from the reservoir 390, into the inlet tube 310, to the venturi tube 350, and out of the outlet tube 370, as discussed below.

Each of the inlet tubes 310 has a first end 312 and a second end opposite 314 and spaced apart from the first end 312. The pump inlet 332 is coupled to, and in fluid communication with, a first end 312 of each of the inlet tubes 310. Liquid in the reservoir 390 is pumped by the pump 330 through the first end 312 of each of the inlet tubes 310 and flows to the second end 314 of each of the inlet tubes 310. The second end 314 of each of the inlet tubes 310 is coupled to, and in fluid communication with, the inlet port 352 of one of the venturi tubes 350.

Each of the outlet tubes 370 has a first end 372, a second end 374 opposite and spaced apart from the first end 372, and an intermediate portion 376 disposed between the first end 372 and second end 374 of the outlet tube 370. The first end 372 of each outlet tube 370 is coupled to, and in fluid communication with, the outlet port 354 of one of the venturi tubes 350. The second end 374 of each of the outlet tubes 370 is coupled to, and in fluid communication with each other. The combined outlet tubes 370 are in fluid communication with the reservoir 390. The intermediate portion 376 of each of the outlet tubes 370 is helically shaped and, similar to the outlet tube 170 shown in FIGS. 1A and 1B, extends around a helical axis of the intermediate portion 376. The intermediate portion 376 can include any number of rotations and/or angled bends about the helical axis that are shown in FIGS. 1A-2D.

Valves 302 are included throughout the aeration system 300 to regulate the flow rate of the fluid through the various components of the aeration system 300.

As with the device 100 shown in FIGS. 1A and 1B, the pump 330 causes a pressure differential between the pump inlet 352 and pump outlet 354, which causes the liquid to flow into the inlet tubes 310, through the venturi tubes 350, and through outlet tubes 370 of the aeration system 300. The pump 330 shown in FIG. 11 is capable of pumping a total of 50 gallons per minute or more of liquid through the inlet tubes 310, venturi tubes 350, and outlet tubes 370 of the aeration system 300. However, in other implementations, the pump is capable of pumping liquid at any desired flow rate through the inlet tubes, venturi tubes, and outlet tubes of the aeration system based on the volume of liquid in the liquid reservoir and the desired amount of gases to be dissolved in the liquid reservoir. The pump 330 shown in FIG. 11 is a centrifugal pump, but in other implementations, the pump is a reciprocating pump, a rotary pump, or any other type of pump capable of pumping a liquid/solid mixture through the aeration device.

As the liquid flows from the inlet port 352 of the venturi tubes 350 to the outlet port 354 of the venturi tubes 350, the venturi effect causes gases (e.g., air) from outside of the reservoir 390 to flow through the air intake port 358 into the mixing chamber 356 of each venturi tube 350. The gases then flow with the liquid through the outlet port 354 of the venturi tube 350, through the outlet tube 370, and into the reservoir 390. As the liquid and the gases flow through the one or more rotations of the intermediate portion 376 of each of the outlet tubes 370, the gases are gently mixed with the liquid such that the relatively large bubbles of gas dissolve into the liquid.

Although the aeration system 300 shown in FIG. 11 includes four inlet tubes 310, four venturi tubes 350, and four outlet tubes 370, in other implementations, the aeration system includes two or more inlet tubes, two or more venturi tubes, and two or more outlet tubes.

EXAMPLES

A small scale aeration system was tested with a venturi injector, a pump, a coiled pipe, and connections. The dissolved oxygen was experimentally measured over time in the aeration tank. An analytical model of the system was also developed and validated with the experimental results. Based on the results of the experimental system and analytical model, a proposed system was developed which has a Standard Aeration Efficiency ("SAE") higher than 3.5.

A small scale experimental system was built to see the performance of the venturi injectors with coiled pipe of varied length. The equipment used to build the system are listed below in Table 1.

TABLE 1

List of Equipment

| Equipment | Quantity |
| --- | --- |
| ½ hp Centrifugal Pump | 1 |
| Pex Pipe (1 in. Dia) | 100 ft. |
| Mazzei Venturi Injectors (1 inch Dia) | 1 |
| Digital Pressure Gauge | 2 |
| Digital Flow Meter | 2 |

TABLE 1-continued

List of Equipment

| Equipment | Quantity |
| --- | --- |
| Aeration Tank Size (300 Gallons) | 1 |
| Ball Valve | 6 |
| Optical DO Probe | 2 |
| Temperature Sensor | 1 |

Two Vernier optical dissolved oxygen ("DO") probes were used to measure the instantaneous dissolved oxygen concentrations in the aeration tank. The probes were installed at two different heights to measure how well the gas was mixing with the water. The data was collected by the probes at a frequency of 1 Hz. The DO probe has the capability of self-calibration based on the atmospheric pressure and temperature.

Figure 3:
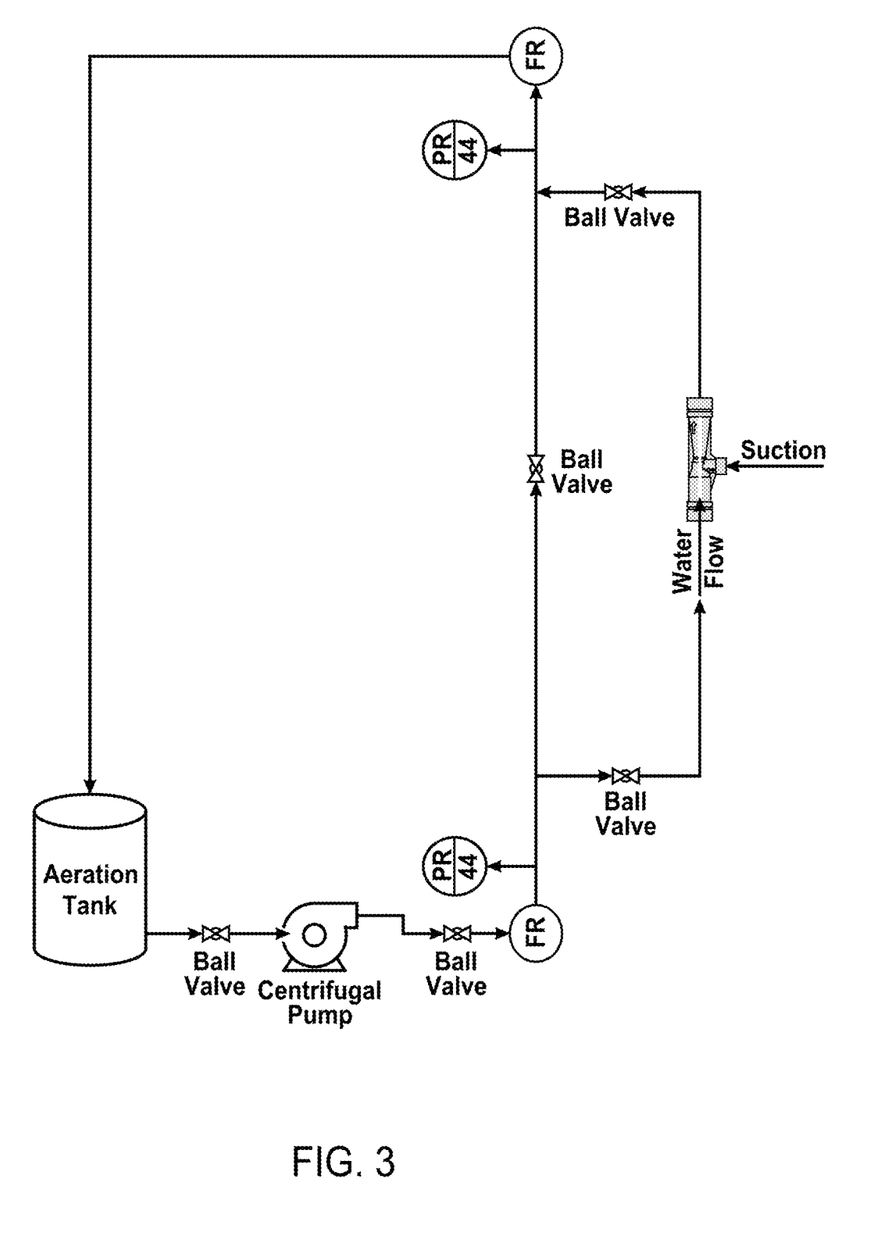
FIG. 3 is a schematic view of an experimental setup, according to another implementation.
Figure 4:
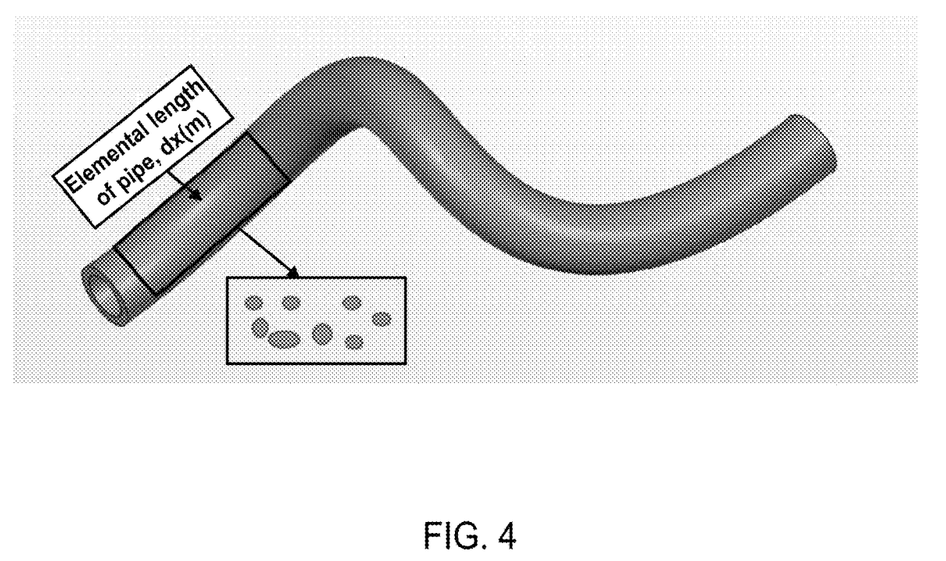
FIG. 4 is a side view of a pipe with bubbles flowing through the pipe.

The Mazzei venturi injectors were connected as shown in FIG. 3. Ball valves were included in the system to control the pressure differential such that a proper vacuum was created to cause air suction. To measure the flow and pressure in the line while the injector was working, a pressure gauge and flow meter were attached on each side of the venturi injectors.

The pump and aeration tanks were on the same surface, creating a positive pressure head in the pump suction side. The pump was self-priming and has a designated six-gallon, pressurized tank attached to it. The suction side water flow rate was controlled with a ball valve. A coiled Pex pipe was coupled to the discharge end of the venturi injector, and the opposite end of the Pex pipe was disposed over the surface of the water in the aeration tank.

Testing the aeration system was performed in two steps: (1) deoxygenate the testing water and (2) reaerate the testing water while recording the DO concentration. To deoxygenate the testing water, Sodium Sulfite ($Na_2SO_3$) was added to the water, which produced Sodium Sulfate $Na_2SO_4$. The following equation shows the chemical reaction between the testing water and the Sodium Sulfite:

$$2Na_2SO_3 + O_2 \rightarrow 2Na_2SO_4$$

Theoretically, 7.88 mg/L of Sodium Sulfite is required to scavenge 1 mg/L of dissolved oxygenation concentrations. After the deoxygenation process was completed, the reaeration system was initiated along with monitoring the DO level in the tank using the DO probe. FIG. 3 represents the schematic of the current experimental setup.

The analytical model used in the experiment was the discrete bubble model. The discrete bubble model was first used to measure plug flow through a tank of well-mixed water. Bubbles affect flow significantly when they are experiencing a large pressure gradient and velocity variations. The discrete bubble model tracks the motion of every bubble as discrete entities and the bubble deformation due to mass transfer across the surface of the bubble. The main characteristics of this model are that (1) it is based on the Euler-Euler approach, (2) it is capable of solving homogeneous multiphase flow, (3) it employs the volume averaged mass and momentum conservation equation to describe time dependent motion of both phases, (4) it represents the bubble number contained in a computational cell by a volume fraction, and (5) it obtains the bubble size information by incorporating population balance equations with break-up and coalescence of bubbles as well as growth or shrinkage of bubbles due to mass transfer across the bubble surface.

In this study, the discrete bubble model was used to predict the rate of oxygen transfer during bubble aeration. The bubbles were assumed to be moving with the fluid with an average mixture velocity. The number of bubbles in the pipe at any given time was assumed to be invariable, considering that no input of the system was changed. The bubbles were simply experiencing the force of pressure inside the pipe, which varied along the pipe length. Surface tension and liquid head pressure was negligible in this case. While the bubbles were inside the pipe, it was assumed that bubble break-up and coalescence did not occur. The flow was incompressible with volume average mixture density being used. The distribution of the bubble size was represented by a single Sauter-mean diameter without any loss of computational accuracy. The water and air temperature were assumed to be equal and constant.

The mass transfer flux across the surface of a bubble was calculated by:

$$J = K_L(C_s - C) \, (\text{mol} \cdot \text{m}^{-2} \cdot \text{s}^{-1})$$

Where, $K_L$=liquid side mass transfer coefficient, $C_s$=equilibrium concentration at the gas/water interface, and C=bulk aqueous-phase concentration.

The gas side mass transfer resistance has been neglected. The equilibrium concentration can be expressed as:

$$C_s = HP_i \, (\text{mol} \cdot \text{m}^{-3})$$

Where, H=Henry's constant, and $P_i$=partial pressure of the gas.

Thus, the first equation can be shown as:

$$J = K_L(HP_i - C) \, (\text{mol} \cdot \text{m}^{-2} \text{s}^{-1})$$

Henry's constant H ($\text{mol} \cdot \text{m}^{-3} \cdot \text{bar}^{-1}$) and mass transfer coefficient ($\text{ms}^{-1}$) can be determined in the following way:

$$H_O = 2.125 - 5.021 \times 10^{-2} T + 5.77 \times 10^{-4} T^2 \, (T \text{ in } ° \text{ C.})$$

$$H_N = 1.042 - 2.450 \times 10^{-2} T + 3.17 \times 10^{-4} T^2 \, (T \text{ in } ° \text{ C.})$$

and $$K_L = 0.6r \quad r < 6.67 \times 10^{-4} \text{ m}$$

$$K_L = 4 \times 10^{-4} \quad r \leq 6.67 \times 10^{-4} \text{ m}$$

The rate of mass transfer across the surface area of the bubble of radius r can be obtained from the mass transfer flux equation:

$$\frac{dm}{dt} = J \times A = K_L(HP_i - C) \times 4\pi r^2 \, (\text{mol} \cdot \text{s}^{-1})$$

The bubble is moving with the water with mixture velocity $v_b$. At any given time, the location of the bubble inside the pipe along the horizontal axis can be related by the following equation:

$$\frac{dx}{dt} = v_b \, (\text{m} \cdot \text{s}^{-1})$$

Since, the bulk aqueous-phase concentration does not change significantly during the travel of bubbles inside the pipe, the pseudo steady state assumption may be considered. From this equation, it is possible to determine the mass transfer of gaseous species per bubble per unit length of pipe:

$$\frac{dm}{dx} = -K_L(HP_i - C)\frac{4\pi r^2}{v_b} \,(\text{mol} \cdot \text{m}^{-1})$$

The number of bubbles in the pipe at any instant is constant. This number of bubbles was calculated by knowing the volumetric flow through the venturi injector, $Q_0$ and the initial bubble volume, $V_0$:

$$N = \frac{Q_0}{V_0} (\text{s}^{-1})$$

By multiplying the mass transfer equation for a single bubble with N, the total mass transfer per unit length per unit time can be calculated:

$$\frac{dm}{dx} = -K_L(HP_i - C)\frac{4\pi r^2}{v_b} \,(\text{mol} \cdot \text{m}^{-1}\text{s}^{-1})$$

The above equation is a one-dimensional, ordinary differential equation. On the righthand side, the variables are H, which is a function of temperature only, and the mass transfer coefficient $K_L$ is a function of bubble radius.

Bubble radius will change with the pressure inside the pipe and with the mass transfer of oxygen and nitrogen gas. The ideal gas law can be used for the purpose of measuring the change in radius of the bubble.

The pipe used in this experiment was a coiled pipe. To include the effect of a coiled pipe in the calculation of friction loss, the "Mishra and Gupta" correction factor was used with Blasius correlations. The correction factor for curved or helically coiled tubes, taking into consideration of equivalent curve radius $R_C$, is:

$$f = 0.316 \, Re^{-\frac{1}{4}} + 0.0075 \sqrt{\frac{D}{2R_C}}$$

With $$R_C = R\left[1 + \left(\frac{H}{2\pi R}\right)^2\right]$$

Where, P=Pipe Diameter, R=Curve Radius, H=Helicoidal Pitch, and Re=Reynolds Number.

The two-phase flow was modeled by the homogeneous flow model, which is the simplest technique for analyzing multiphase flows. In the homogeneous model, both liquid and gas phases move at the same velocity (slip ratio=1). This is also known as the zero slip model. The homogeneous model considers the two-phase flow as a single-phase flow. The average fluid properties are measured in a homogeneous model, considering the two-phase flow as a single-phase flow in which the properties depend upon mixture quality. Thus, the frictional pressure drop can be calculated by assuming a constant friction coefficient between the inlet and outlet sections of the pipe.

For this analysis, one parameter is determined, which is known as mass quality, defined as:

$$\chi = 1 - \left(\frac{Q_{air}}{Q_{water}}\right)$$

Two phase viscosity GO based on the mass averaged value of reciprocals can be shown as:

$$\mu_m = \left(\frac{\chi}{\mu_g} + \frac{1-\chi}{\mu_l}\right)^{-1}$$

The mixture density can also be obtained in the same way:

$$\rho_m = \left(\frac{\chi}{\rho_g} + \frac{1-\chi}{\rho_l}\right)^{-1}$$

The Reynolds number of the mixture can be found by:

$$Re = \frac{\rho \times v_m \times D_p}{\mu_m}$$

Where, $D_p$=pipe diameter.
The velocity of the mixture is calculated in the following way:

$$v_m = (Q_{air} + Q_{water})/A_{pipe}$$

Where, $A_{pipe}$=pipe area, $(\pi/4) \times D_p^2$.

Figure 5:
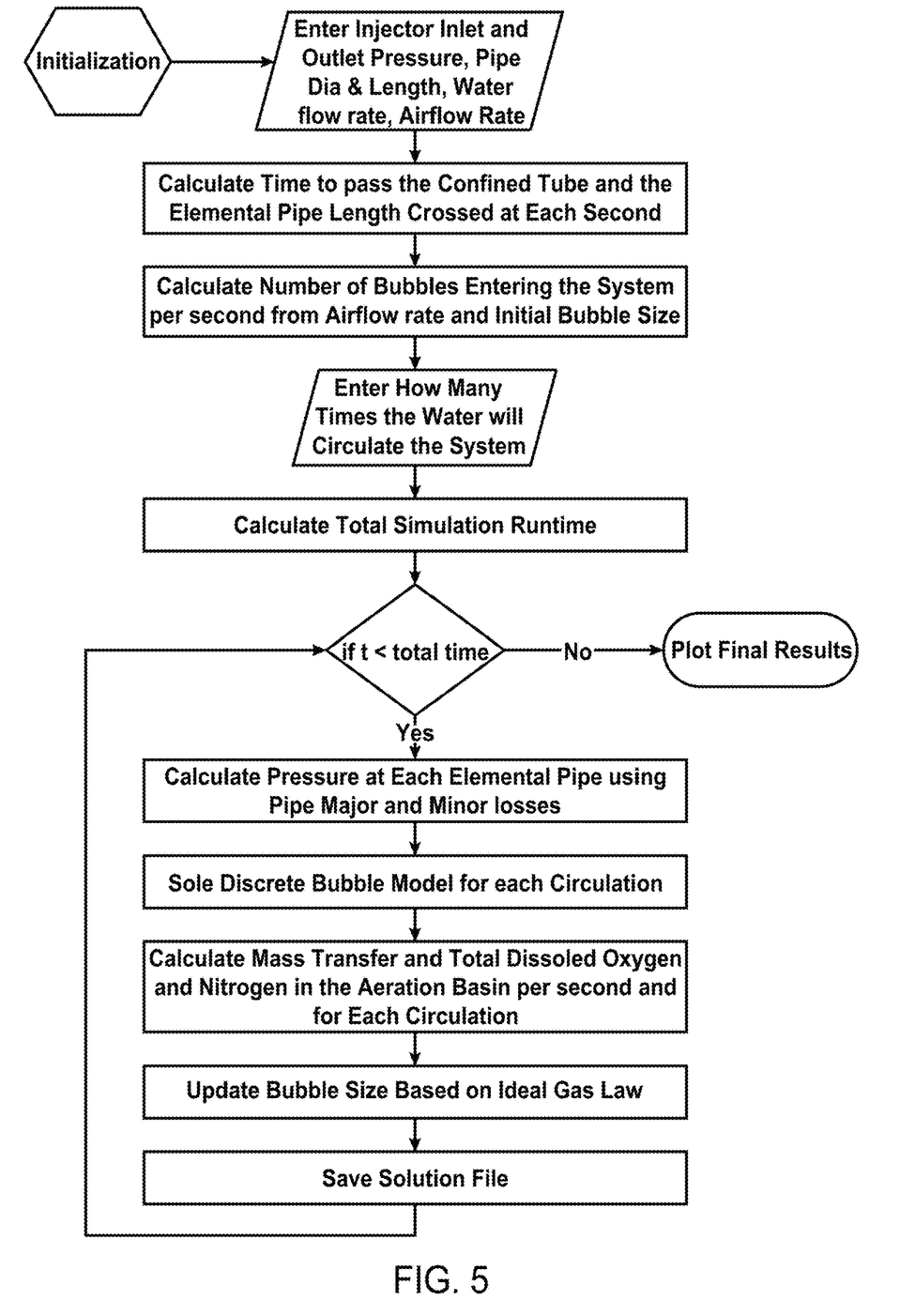
FIG. 5 is a flowchart of an algorithm used for a discrete bubble model.

All the necessary equations to calculate the mass transfer in the discrete bubble model have been discussed. FIG. 5 shows an overview of the algorithm structure that was used in the calculation.

The experimental and analytical results of the oxygen transfer tests have been shown in FIGS. 6-9. Different parameters were measured during the experiments for observing dissolved oxygen with respect to time in the aeration tank. There were two oxygen probes used at different depths of the tank to observe the oxygen level at different depths. The oxygen probes collected one sample of data per second. The variation of dissolved oxygen data in the two probes was insignificant, confirming that the water in the aeration tank had been well mixed with air.

Figure 6:
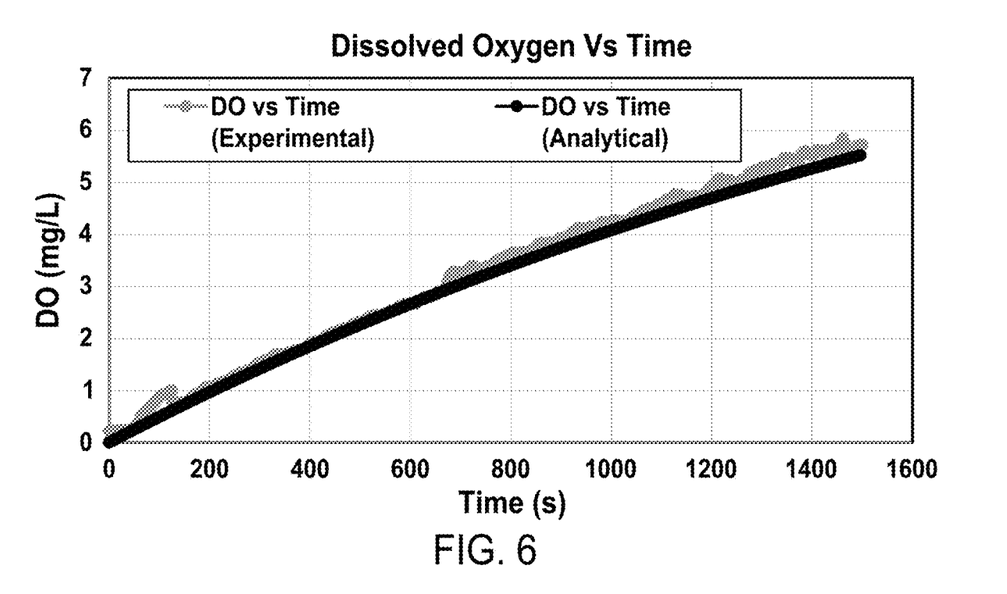
FIG. 6 is a graph of the experimental and analytical results of an oxygen transfer test.

FIG. 6 shows the average results of two oxygen probes, and the analytical results are plotted in the same graph to see how the results conform to each other.

TABLE 2

| Input Parameters for the Test | | |
|---|---|---|
| Parameters | Experimental | Analytical |
| Pipe Length (ft) | 20 | 20 |
| Pipe Diameter (inch) | 1 | 1 |
| Number of Aerators | 1 | 1 |
| Injector Inlet Pressure (PSI) | 17.8 | 17.8 |
| Injector Outlet Pressure (PSI) | 5.4 | 5.4 |
| Airflow rate (SCFM) | .302 | .302 |
| Water Flow Rate (CFM) | 1.26 | 1.26 |
| Aeration Tank Size (Gallons) | 250 | 250 |
| Temperature (deg. Celsius) | 25 | 25 |

It can be seen from the graph shown in FIG. 6 that the DO results obtained from the analytical model mostly fall within 10% of the measured data, although it underestimates the results. This discrepancy is mostly due to the degree of variability of the bubble size in real measurements compared to the analytical model. In the analytical model, all bubbles were considered spherical in shape, which is not true in of the real phenomena. Moreover, the effect of turbulent mixing inside the pipe was not included in the model. The mixture velocity is also another source of error. The average velocity was considered without considering the time dependent velocity change due to the turbulent flow inside the pipe.

After the first experiment, several input parameters were changed to see the effect the parameters had on system performance. The system performance was tested based on the 'Dissolved Oxygen vs Time' and 'Standard Aeration Efficiencies'.

Figure 7:
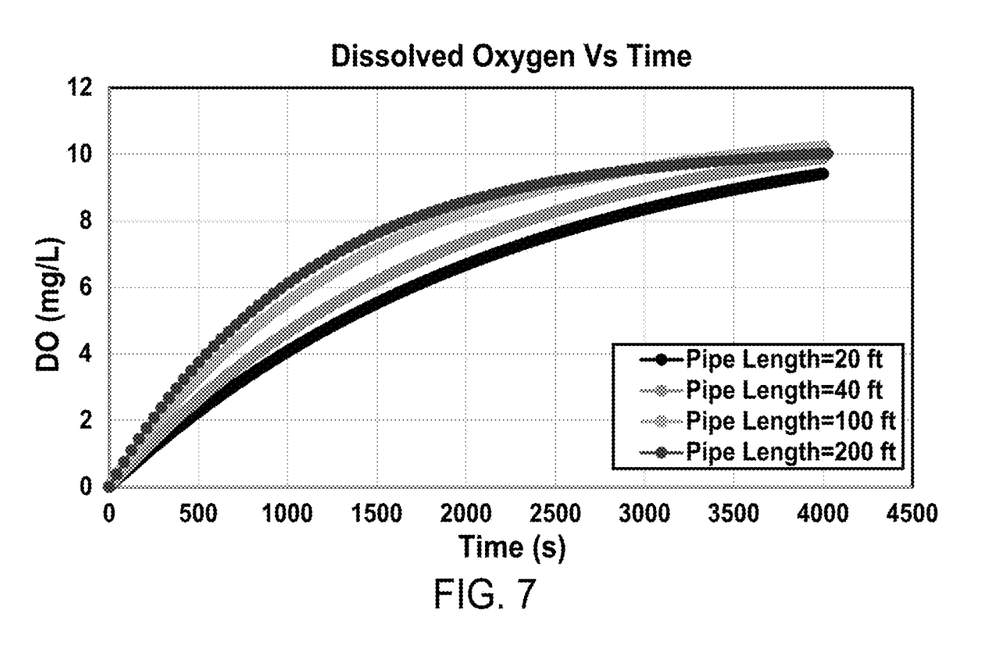
FIG. 7 is a graph of the analytical results of an oxygen transfer test for different pipe lengths.

The first varied parameter was the length of the pipe. Keeping all the parameters the same as shown in Table 2, only the pipe length was varied. The results of this experiment are shown in FIG. 7. It can be seen from the DO results in the graph shown in FIG. 7 that, with the pipe length increased, the amount of oxygen transfer rate also increases. This is due to the fact that bubbles are able to have more hanging time inside the pipe, which eventually affected the system performance in a positive way.

Figure 8:
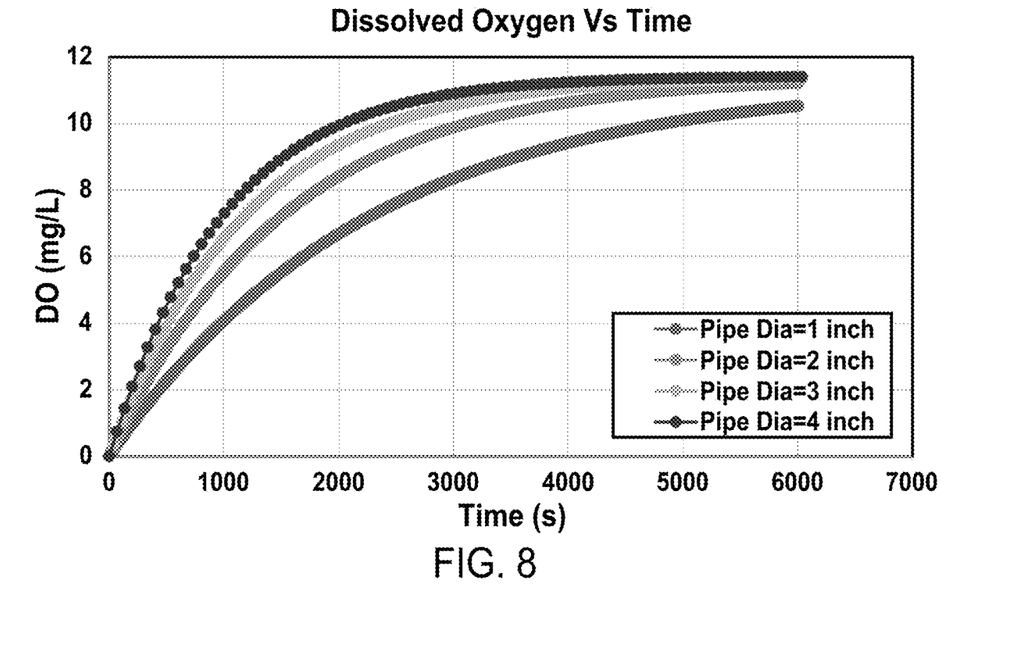
FIG. 8 is a graph of the analytical results of an oxygen transfer test for different pipe diameters.

The next varied parameter was the diameter of the pipe. A similar analysis as discussed above with respect to the length of the pipe was performed. The pipe diameter effect is seen in the graph shown in FIG. 8. As seen in FIG. 8, the change in pipe diameter affects the oxygen transfer rate more than a change in the pipe length. An increase in pipe diameter decreases the mixture velocity, which in turn increases the hanging time of the bubble significantly. Therefore, by maintaining the same amount of water flowrate (e.g., operating the pump in the same way), only increasing the pipe diameter can significantly increase the system performance.

Final parameter that was varied is the number of injectors. For this test, a pipe manifold was constructed with each line having a single venturi injector. Thus, each manifold lines had its own internal pressure loss. Therefore, the water flowrate across each line was not equal. However, when multiple injectors were used, all of the lines had bubbles in their flow path.

Figure 9:
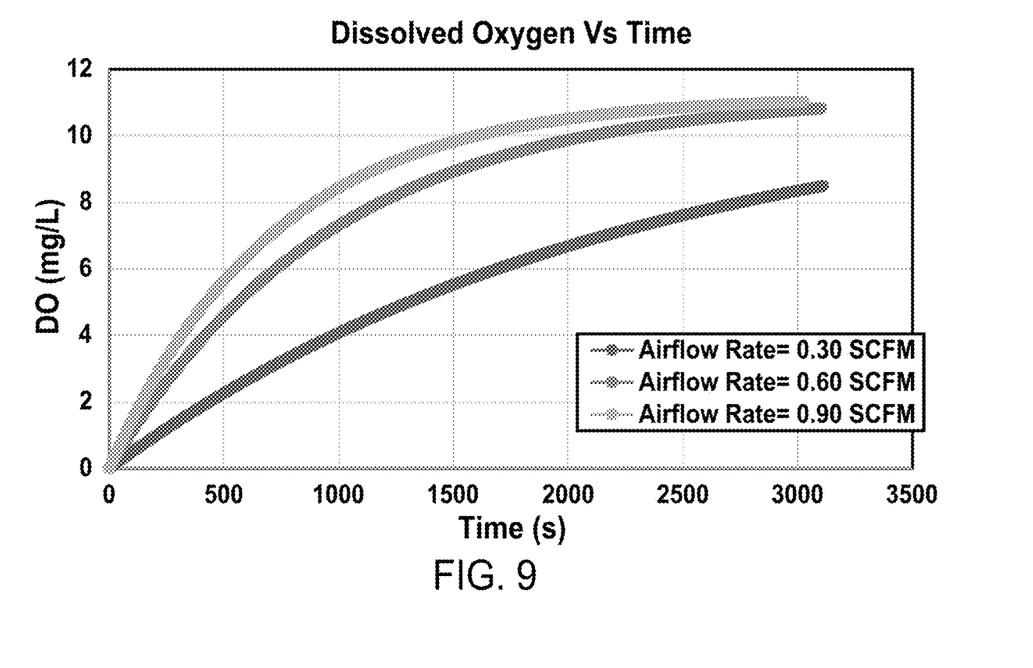
FIG. 9 is a graph of the analytical results of an oxygen transfer test for different injector numbers.
Figure 10:
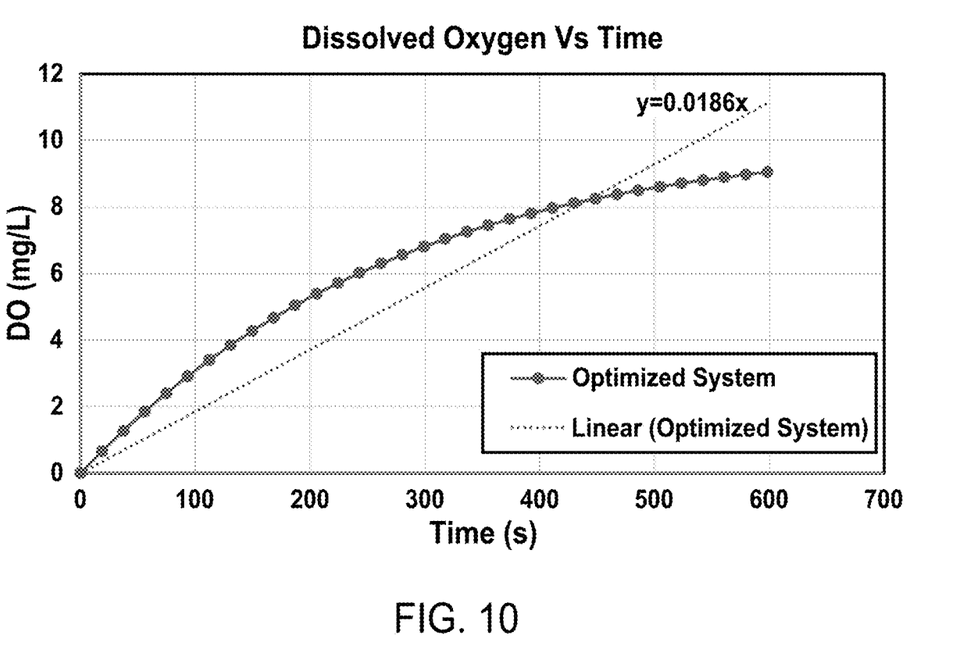
FIG. 10 is a graph of the analytical results of an oxygen transfer test for a proposed system.

As seen in the graph shown in FIG. 9, increasing the number of injectors increases the total airflow rate for the system. Since the number of bubbles depend on the airflow rate in the system, more bubbles are present when the total airflow rate is increased. Overall, this will increase the total mass transfer in the system inside the pipe.

Based on all the analysis done, a new system is proposed to reach a SAE over 3.5. Because the proposed system is considered for real life scenarios, the size of the system is much larger than the systems tested. The input parameters that are considered for this system are listed below in Table 3.

TABLE 3

Input Parameters for the Proposed System

| Parameters | Analytical |
| --- | --- |
| Pipe Length (ft) | 200 |
| Pipe Diameter (inch) | 4 |
| Number of Aerators | 4 |
| Injector Inlet Pressure (PSI) | 20 |
| Injector Outlet Pressure (PSI) | 5 |
| Airflow rate (SCFM) | 20 |
| Water Flow Rate (CFM) | 36 |

TABLE 3-continued

Input Parameters for the Proposed System

| Parameters | Analytical |
| --- | --- |
| Aeration Tank Size (Gallons) | 25000 |
| Temperature (deg. Celsius) | 25 |

Multiple simulations have been performed in the analytical model before coming up with the input parameters mentioned above, and the optimized system can operate at an SAE of 3.5 or greater. The SAE for this system is calculated along the slope line which passes through the origin. The equation for the slope is:

DO(mg/L)=0.0186 (mg/L/s)*time(s)

At a given time (time=100 s), the DO is:

DO(mg/L)=1.86 mg/L

Now total amount of dissolve oxygen in the aeration tank is:

Total Dissolved Oxygen(lbs)=DO*Vol of Aeration Tank*3.785 liter/gallon*2.205*10^-6 lbs/mg =1.86 mg/L*25,000 gallon*3.785 liter/gallon*2.205*10^-6 lbs/mg =0.39 lbs of Oxygen Next, the power delivered by the Pump to the system is calculated using the discharge pressure and fluid flowrate:

Fluid_Power=Pressure*Water flowrate*6894.76 pascal/psi

=20 psi*0.017 m^3/s*6894.76 pascal/psi

=2,344 Watts

=2.344 kW

Total Power consumed for time=100 s=100 s/(3600 s/h) =0.028 hours can be calculated by following equation:

Total Input Power=Fluid Power/(Eff of motor*Eff of pump)×time

=2.344 kW/(0.945*0.86)*0.028 hrs

=0.080 kWh*1/0.746 (hp/kW)

=0.11 hp-hr

Finally, SAE can be calculated in the following way:

SAE=Total Dissolved Oxygen/Total Input Power

=0.39 lbs of Oxygen/0.11 hp-hr

=3.61 which is constant along the slope line

FIG. 11 shows a schematic view of a proposed optimized system based on the above calculations. The whole system is a closed loop system, i.e., the suction side of the pump is under the aeration basin/pond. The water reaches the main discharge line located at the top of the surface of the basin. There is a pressure gauge to measure the pressure of the upcoming fluid. The pipe manifold is included after the pressure gauge. The pipe manifold consists of four parallel lines, and each line contains one venturi injector. A pressure gauge is included at each injector inlet to determine the inlet pressure of each injectors. Each line has one pressure reducing valve to create the required pressure differential in each injector line to produce a vacuum for air suction. All of the injector lines are joined to form a single discharge line. This discharge line has a coiled pipe which can stay at the surface of the water close to the aeration basin. In use, the water from the discharge line is ejected into the aeration basin.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An aeration device comprising:
   a venturi tube having an outlet port and an air intake port; and
   an outlet tube having a first end coupled to the outlet port of the venturi tube, a second end opposite and spaced apart from the first end, and an intermediate portion disposed between the first and second ends of the outlet tube,
   wherein the intermediate portion is helically shaped and extends around a helical axis of the intermediate portion, wherein the intermediate portion extends at least one rotation about the helical axis, and
   wherein the helical axis is disposed at an angle to a gravitational axis, wherein the angle is greater than 0 degrees and less than 180 degrees.

2. The aeration device of claim 1, wherein the angle is 90 degrees.

3. The aeration device of claim 1, wherein the at least one rotation comprises no angled bends in the outlet tube.

4. The aeration device of claim 1, wherein the at least one rotation comprises three or more angled turns.

5. The aeration device of any one of claim 1, wherein the at least one rotation comprises two rotations.

6. The aeration device of any one of claim 1, wherein the at least one rotation comprises three rotations.

7. The aeration device of any of claim 1, wherein the at least one rotation comprises four or more rotations.

8. The aeration device of claim 1, further comprising a pump for pumping a liquid through the venturi tube and the outlet tube.

9. The aeration device of claim 8, wherein the pump causes the liquid to flow through the outlet tube at 50 gallons per minute or more.

10. An aeration system comprising:
    two or more venturi tubes, each of the two or more venturi tubes having an outlet port and an air intake port; and
    two or more outlet tubes, each of the two or more outlet tubes having a first end coupled to the outlet port of one of the venturi tubes, a second end opposite and spaced apart from the first end, and an intermediate portion disposed between the first and second ends of the outlet tube,
    wherein the intermediate portion is helically shaped and extends around a helical axis of the intermediate portion, wherein the intermediate portion extends at least one rotation about the helical axis.

11. The aeration system of claim 10, wherein each of the second ends of the two or more outlet tubes are coupled together such that the second ends of the two or more outlet tubes are in fluid communication with each other.

12. The aeration system of claim 10, wherein the helical axis is disposed at an angle to a gravitational axis, wherein the angle is greater than 0 degrees and less than 180 degrees.

13. The aeration system of claim 12, wherein the angle is 90 degrees.

14. The aeration system of claim 10, wherein the at least one rotation comprises no angled bends in the outlet tube.

15. The aeration system of claim 10, wherein the at least one rotation comprises three or more angled turns.

16. The aeration system of any one of claim 10, wherein the at least one rotation comprises two rotations.

17. The aeration system of any one of claim 10, wherein the at least one rotation comprises three rotations.

18. The aeration system of claim 10, further comprising a pump for pumping a liquid through the two or more venturi tubes and the two or more outlet tubes.

19. The aeration system of claim 18, wherein the pump causes the liquid to flow through the two or more outlet tubes at a total of 50 gallons per minute or more.

* * * * *